United States Patent [19]

Inui et al.

[11] Patent Number: 5,362,785
[45] Date of Patent: Nov. 8, 1994

[54] RUBBER COMPOSITION SUITABLE FOR AUTOMOBILE TIRES AND ITS PRODUCTION

[75] Inventors: Naoki Inui, Yamatokoriyama; Hideo Nagasaki, Osaka; Shinichi Yachigo, Toyonaka, all of Japan

[73] Assignee: Sumitomo Chemical Company, Limited, Osaka, Japan

[21] Appl. No.: 886,094

[22] Filed: May 21, 1992

[30] Foreign Application Priority Data

May 22, 1991 [JP] Japan ................. 3-117320

[51] Int. Cl.$^5$ ............ C08K 5/16; C08K 5/32; C08K 5/36
[52] U.S. Cl. ............... 524/259; 524/257; 524/571; 525/329.3; 525/332.6; 525/332.7; 525/377
[58] Field of Search ......... 524/259, 257, 571; 525/329.3

[56] References Cited

U.S. PATENT DOCUMENTS

| | | |
|---|---|---|
| 3,367,904 | 2/1968 | Muilins et al. |
| 3,756,959 | 8/1973 | Danielson. |
| 3,872,062 | 3/1975 | Lawrence ............ 525/331.8 |
| 4,110,319 | 8/1978 | Lawrence ............ 525/331.1 |
| 4,861,842 | 8/1989 | Cohen et al. ......... 525/330.4 |
| 5,106,913 | 4/1992 | Yamaguchi et al. ... 524/495 |
| 5,109,055 | 4/1992 | Nagasaki et al. .... 524/571 |

FOREIGN PATENT DOCUMENTS

| | | |
|---|---|---|
| 0253365 | 1/1988 | European Pat. Off. |
| 0345594 | 12/1989 | European Pat. Off. |
| 0410152 | 1/1991 | European Pat. Off. |
| 618426 | 12/1945 | United Kingdom. |

OTHER PUBLICATIONS

*Rubber Technology and Manufacture*, Second Edition, pp. 200–201, Butterworths, London, 1982.

Primary Examiner—Paul R. Michl
Assistant Examiner—Olga Asinovsky
Attorney, Agent, or Firm—Stevens, Davis, Miller & Mosher

[57] ABSTRACT

A styrene/butadiene copolymer rubber to be used for automobile tires is lowered in its rolling resistance by blending it with carbon black and the following components (A) and (B):

(A) a dinitrodiamine compound represented by the following formula (I):

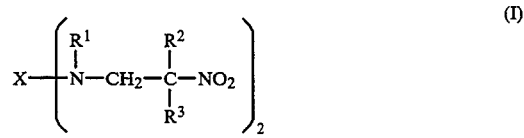

wherein X is a divalent organic group such as an alkylene, $R^1$ is hydrogen or an organic group such as an alkyl, provided that two nitrogen atoms linking through X may further link through $R^1$, and $R^2$ and $R^3$ are each hydrogen or an alkyl, provided that $R^2$ and $R^3$ may conjointly form a ring; and (B) a sulfide compound selected from dibenzothiazyl disulfide, tetralkylthiuram disulfide, and alkyl- or hydroxy-substituted phenol sulfide resin. The dinitrodiamine compound (A) and the sulfide compound (B) are added simultaneously to the rubber together with the carbon black in a first kneading step of a high temperature.

18 Claims, No Drawings

RUBBER COMPOSITION SUITABLE FOR AUTOMOBILE TIRES AND ITS PRODUCTION

BACKGROUND OF THE INVENTION

1. Field of the Invention

The present invention relates to a rubber composition to be suitably used for automobile tires, in particular for a tread material thereof, and also relates to a process for producing the same. More particularly, the invention relates to a rubber composition capable of lowering rolling resistance of the tires and to a process for producing the same.

2. Description of Background

In the recent history of the automotive industry, demands for economy, such as saving of natural resources and saving of energy, have been important tasks to be undertaken in addition to demands for durability and safety, and the reduction of fuel consumption has been required for automobiles in order to meet such demands. Thus, the automobile tires of today are required to have even lower rolling resistance, which lower rolling resistance corresponds to a reduction in fuel consumption.

The rolling resistance of automobile tires is caused by energy scattering when the rubber tires undergo periodic deformation at relatively low frequency during driving, and it can be lowered by decreasing the energy loss (hysteresis loss) during driving. It is known that the rolling resistance corresponds to tan $\delta$ (loss factor to be an index for the hysteresis loss) at around 60° C. by converting the deformation frequency to the temperature in accordance with the Williams-Landel-Ferry equation of a temperature conversion rule. Therefore, rubber materials having a small tan $\delta$ at around 60° C. have been demanded in order to lower the rolling resistance.

For lowering the rolling resistance, there have heretofore been known such methods as improvement in microstructure or molecular weight distribution of the rubber, improvement in compounding formulation of organic rubber chemicals or reinforcing agents, and addition of modifiers. Among them, the addition of modifiers is drawing public attention, since it can lower the rolling resistance more easily than other methods and can also be applied to a natural rubber.

As an example of such a modifier, EP-A-253365 (the entire disclosure of which is herein incorporated by reference) has proposed a dinitrodiamine compound represented by the following formula (I):

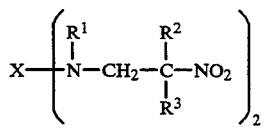

wherein X is a divalent aliphatic, alicyclic or aromatic group which may contain halogen or oxygen in the group; $R^1$ is hydrogen or an aliphatic, alicyclic or aromatic group, provided that two nitrogen atoms linking through X may further link through $R^1$ when both X and $R^1$ are the aliphatic groups; and $R^2$ and $R^3$ independently of one another are each hydrogen or an alkyl of 1 to 12 carbon atoms, provided that $R^2$ and $R^3$ may conjointly form a ring.

This dinitorodiamine compound can produce excellent rubber compositions which have lower rolling resistance when the compound is incorporated into natural or isoprene rubbers.

Therefore, this dinitrodiamine compound has been intended to be applied to rubber tire materials, and in particular, it has exhibited sufficient characteristics in conjunction with such natural rubbers or isoprene rubbers. However, its effects for synthetic rubbers, such as styrene/butadiene copolymer rubbers, are not necessarily satisfactory in satisfying the demand for the reduction of fuel consumption, which has become more severe in recent years, and hence, further improvements in this area are desired.

OBJECT OF THE INVENTION

It is object of the present invention to further improve the rubber properties, which are already improved to some extent, by the addition of the above-mentioned dinitrodiamine compound to a rubber system mainly composed of a styrene/butadiene copolymer rubber.

It is another object of the invention to further lower rolling resistance of a rubber tire mainly composed of a styrene/butadiene copolymer rubber which has been compounded with a dinitrodiamine compound.

A further object of the invention is to provide a rubber composition comprising a styrene/butadiene copolymer rubber which is improved in rolling resistance.

A still further object of the invention is to provide a process for producing a rubber composition.

Yet a further object of the invention is to provide an automobile tire having excellent rolling resistance and prepared from such a rubber composition.

Other objects will be revealed by the following descriptions.

SUMMARY OF THE INVENTION

Thus, the present invention provides a rubber composition comprising a base rubber mainly composed of a styrene/butadiene copolymer rubber, carbon black, and based on 100 parts by weight of the base rubber the following components:

(A) 0.1 to 10 parts by weight of a dinitrodiamine compound represented by the above formula (I); and (B) 0.1 to 1 part by weight of a sulfide compound selected from a disulfide represented by the following formula (II):

wherein $R^4$ is benzothiazyl or N,N-dialkylthiocarbamoyl having 1 to 6 carbon atoms in each alkyl, and a substituted phenol sulfide resin represented by the following formula (III):

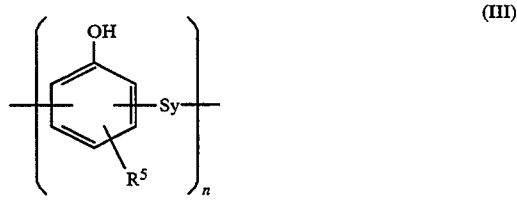

wherein $R^5$ is an aliphatic group of 1 to 12 carbon atoms or hydroxy, y is a numeral of 1 to 6, and n is a numeral of 1 to 20.

In preparing this composition, the timing in adding the sulfide compound of the component (B) is especially important in order to effectively lower the rolling resistance of tires, and hence, the invention also provides a process for producing the rubber composition by adding simultaneously (A) a dinitrodiamine compound represented by the above formula (I), and (B) a sulfide compound selected from a disulfide represented by the above formula (II) and a substituted phenol sulfide resin represented by the above formula (III), in conjunction with carbon black to a base rubber mainly composed of a styrene/butadiene copolymer rubber in a kneading step in a high temperature.

The base rubber to be used in the invention is mainly composed of a styrene/butadiene copolymer rubber, and it may consist essentially of the styrene/butadiene copolymer rubber alone, or may be a rubber blend containing 50% by weight or more of the styrene/butadiene copolymer rubber which is blended with another rubber. The rubbers suitable to be blended with the styrene/butadiene copolymer rubber include, for example, a natural rubber and a butadiene rubber.

Styrene/butadiene copolymer rubber materials are largely used for automobile tires, especially for passenger car tires, and when such materials are blended with the dinitrodiamine compound (A) and the sulfide compound (B) in accordance with the invention, the tan δ of the vulcanized rubber at around 60° C. can be significantly lowered. The styrene/butadiene copolymer rubber may be of the emulsion polymerized type but may also be of the solution polymerized type. Further, the styrene/butadiene copolymer rubber to be used in the invention may be a rubber which is improved in microstructure or molecular weight distribution by solution polymerization or a modified rubber in which an amino group, a tin compound or the like has been introduced to the molecular end of the polymer by solution polymerization. In such improved rubbers and modified rubbers, the combination use system of the dinitrodiamine compound (A) and the sulfide compound (B), according to the invention, can produce excellent results.

Carbon black to be used in the invention can be any of various ones conventionally used and having different reinforcing power, and it includes those types known in the art, for example, SAF, ISAF, HAF, FEF, GPF, SRF, MT, and the like. Its kind is not critical, but preferred is a carbon black having a nitrogen absorption specific surface area of from about 30 to about 130 m²/g, and includes, for example, ISAF, HAF, FEF, GPF, and the like. The amount of the carbon black is also not particularly limited, but is normally preferred to be in a range of from about 10 to about 150 parts by weight, more preferably from about 10 to about 80 parts by weight, based on 100 parts by weight of the base rubber.

Typical examples of the dinitrodiamine compound represented by the above formula (I) to be used as component (A) in the invention are illustrated below, wherein —Z is a group of the formula:

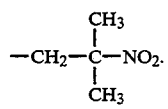

(1) Z—NH—(CH$_2$)$_2$—NH—Z (2) Z—NH—(CH$_2$)$_3$—NH—Z (3) Z—NH—(CH$_2$)$_4$—NH—Z (4) Z—NH—(CH$_2$)$_6$—NH—Z (5) Z—NH—(CH$_2$)$_{10}$—NH—Z (6) Z—NH—(CH$_2$)$_{12}$—NH—Z

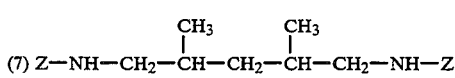

(8) NO$_2$—(CH$_2$)$_2$—NH—(CH$_2$)$_2$—NH—(CH$_2$)$_2$—NH$_2$ (9) NO$_2$—(CH$_2$)$_2$—NH—(CH$_2$)$_6$—NH—(CH$_2$)$_2$—NH$_2$

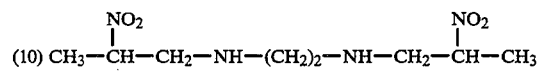

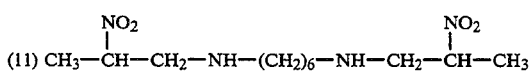

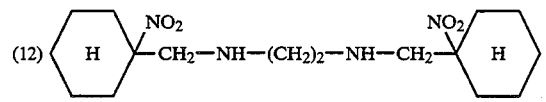

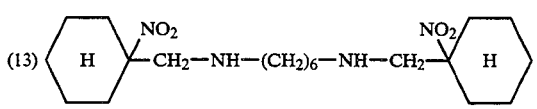

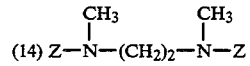

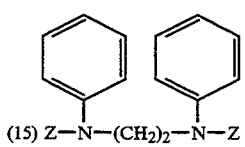

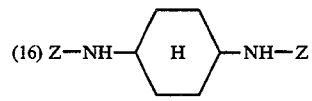

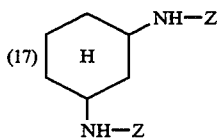

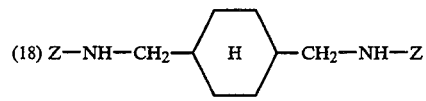

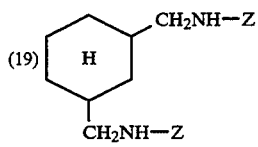 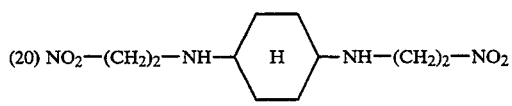
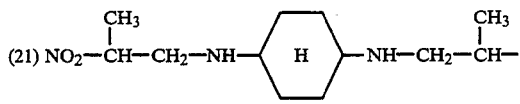 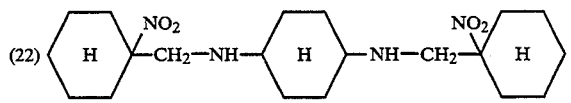
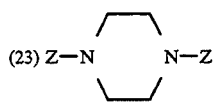 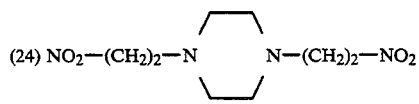
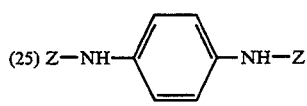 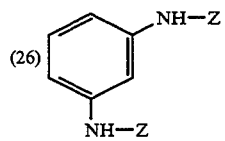
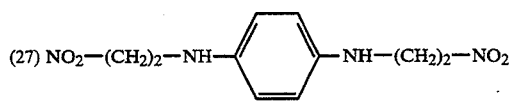 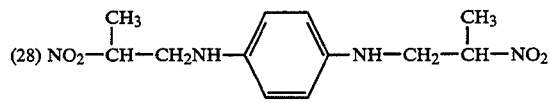
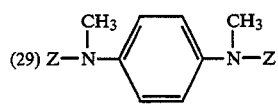 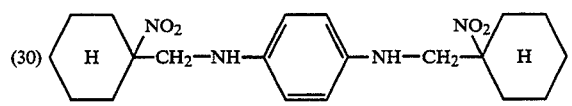
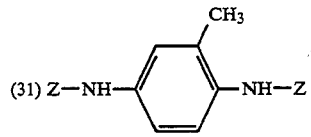 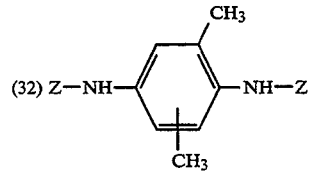
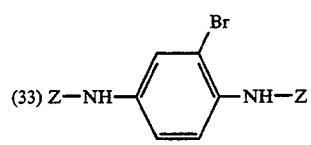 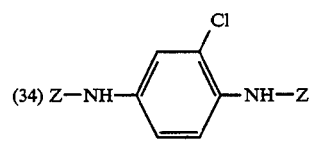
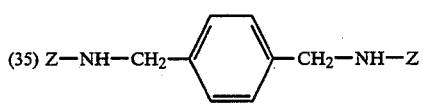
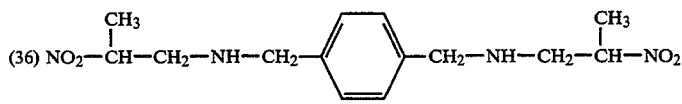
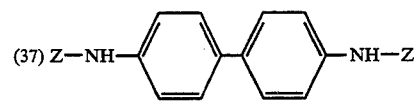 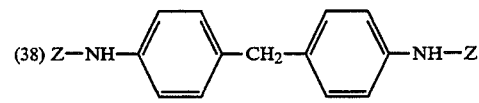
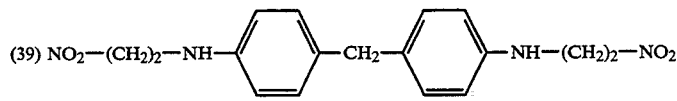

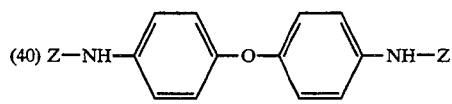
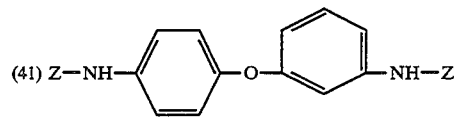

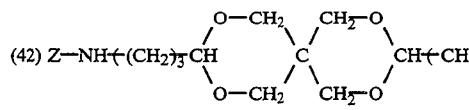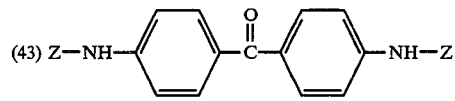

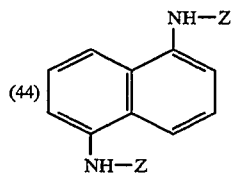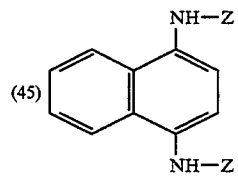

(46) CH$_3$—(CH$_2$)$_5$—C(CH$_3$)(NO$_2$)—CH$_2$—NH—⟨phenyl⟩—NH—CH$_2$—C(CH$_3$)(CH$_3$)—(CH$_2$)$_5$—CH$_3$

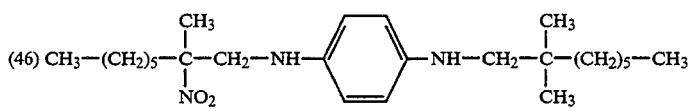

(47) CH$_3$—(CH$_2$)$_{10}$—CH(NO$_2$)—CH$_2$—NH—(CH$_2$)$_6$—NH—CH$_2$—CH(NO$_2$)—(CH$_2$)$_{10}$—CH$_3$

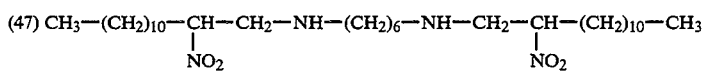

(48) Z—N(C$_6$H$_{11}$)—(CH$_2$)$_2$—N(C$_6$H$_{11}$)—Z

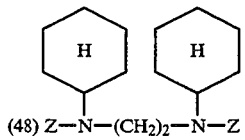

As exemplified above, the bridging group X in the formula (I) is a divalent aliphatic, alicyclic or aromatic group. X may contain halogen (e.g. fluorine, chlorine, bromine or iodine) in the group like the 33rd and 34th examples, and alternatively may contain oxygen in the group like the 40th to 43rd examples. The divalent aliphatic group denoted by X includes, for example, a straight or branched chain group, preferably an alkylene, of 1 to 18 carbon atoms and others. The divalent alicyclic group denoted by X includes, for example, cyclohexylene,

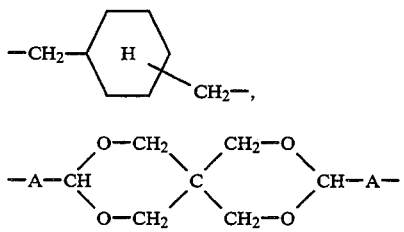

in which A is a lower alkylene, and others. The divalent aromatic group denoted by X includes, for example, phenylene unsubstituted or substituted once or twice by lower alkyl (e.g. methyl) or halogen (e.g. chlorine or bromine),

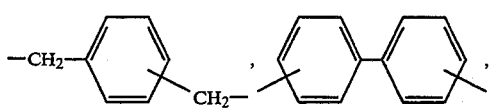

-continued

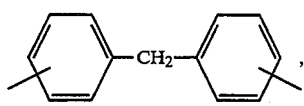

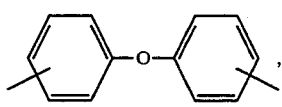

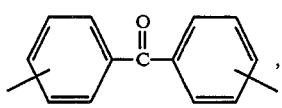

naphthylene and others. Among them, preferred X is the aliphatic group, and more preferably that of 4 to 12 carbon atoms, particularly the alkylene. Another preferred X is the aromatic group, particularly phenylene.

R$^1$ in the formula (I) is hydrogen or an aliphatic, alicyclic or aromatic group. The aliphatic group denoted by R$^1$ includes an alkyl of 1 to 6 carbon atoms and others, the alicyclic group denoted by R$^1$ includes cyclopentyl, cyclohexyl and others, and the aromatic group denoted by R$^1$ includes phenyl, tolyl and others. Among them, preferred R$^1$ is hydrogen, the alkyl, cyclohexyl or phenyl, and more preferred is hydrogen. Alternatively, in case both X and R$^1$ are the aliphatic groups, two nitrogen atoms linking through X can further link through R$^1$ to form a ring, such as a six-membered ring, composed of X, R$^1$ and two nitrogen atoms like the above 23rd and 24th examples. Such ring includes, for example, piperazine ring and others.

$R^2$ and $R^3$ in the formula (I) can be the same or different from each other, and are hydrogen or an alkyl of 1 to 12 carbon atoms. Preferably, at least one of $R^2$ and $R^3$ is an alkyl of 1 to 12 carbon atoms, and more preferably they are both methyl. Alternatively, $R^2$ and $R^3$ can conjointly link to form, together with the carbon atom bonding to them, a ring such as a six-membered ring, like the above 12th, 13th, 22nd and 30th examples.

These dinitrodiamine compounds (A) can be incorporated to the base rubber in any form, and they may be a single compound, a mixture of two or more compounds, a mixture with a carrier, such as clay, which does not affect the properties of the rubber, or a mixture with other additives, for example, the sulfide compound (B) which is another component of the invention.

The amount of the dinitrodiamine compound (A) to be added is from 0.1 to 10 parts by weight based on 100 parts by weight of the base rubber, since too small amount is insufficient for the effect to lower than $\delta$, and too large amount is uneconomical. The dinitrodiamine compound (A) is preferably used in an amount ranging from 0.2 to 3 parts by weight based on 100 parts by weight of the base rubber.

The sulfide compound (B), another essential component of the invention, is selected from those of the above formulas (II) and (III).

The disulfide represented by the formula (II) is, in general, known as a vulcanization accelerator for rubbers. The compound of the formula (II) in which $R^4$ is benzothiazyl is dibenzothiazyl disulfide, and that in which $R^4$ is N,N-dialkylthiocarbamoyl is a so-called thiuram compound which includes, for example, tetramethylthiuram disulfide, tetraethylthiuram disulfide, tetrabutylthiuram disulfide and the like.

The substituted phenol sulfide resin represented by the formula (III) is, in general, known as a crosslinking agent for halogenated butyl rubbers and the like, or as an adhesive for various rubbers. In the formula (III), y is a numeral of 1 to 6, and n is a numeral of 1 to 20, but normally the resin is obtained and marketed as an admixture having y and n in these ranges. $R^5$ in the formula (III) is an aliphatic group, such as an alkyl, of 1 to 12 carbon atoms or hydroxy, and specific examples of the substituted phenol sulfide resin represented by that formula are p-pentylphenol sulfide resin, p-octylphenol sulfide resin, resorcin sulfide resin and the like. Among these substituted phenol sulfide resins, preferred are those in which $R^6$ is an alkyl, and especially preferred are those in which $R^5$ is an alkyl of 3 to 10 carbon atoms.

The amount of the sulfide compound (B) selected from the formulas (II) and (III) to be used is 0.1 to 1 part by weight based on 100 parts by weight of the base rubber, since too small an amount is insufficient in catalytic effects to lower tan $\delta$ of the rubber, and too large an amount will cause deteriorate in the mechanical properties of the rubber. The sulfide compound (B) is used preferably in an amount ranging from 0.1 to 0.5 part by weight based on 100 parts by weight of the base rubber.

In general, when rubbers are compounded with additives, the compounding is in principle carried out in two steps. Thus, fillers such as carbon black and others, process oil, stearic acid, etc. are added to the rubber in a first step of a relatively higher rubber temperature ranging from about 120° to about 220° C., while vulcanizing agents such as sulfur, vulcanization accelerators, accelerator activators, scorch retarders, adhesives, crosslinking agents, etc. are added in a second step at a relatively lower rubber temperature ranging from about 40° to about 100° C.

The dinitrodiamine compound (A) and the sulfide compound (B) in accordance with the invention are both preferably added to the rubber in the first step when the carbon black and others are incorporated, thereby producing a higher effect than the case where the dinitrodiamine compound (A) is added alone. The compounding temperature at that time is normally preferred in a range of from about 140° to about 200° C., and more preferably from about 170° to about 200° C., because the greater temperature results in higher improved effect in rubber properties.

Among the sulfide compound (B) to be used in the invention, the disulfide represented by the formula (II) has been known as a vulcanization accelerator, and the substituted phenol sulfide resin represented by the formula (III) has been known as a crosslinking agent or an adhesive, as described above. That is to say, they have been used for the purpose of shaping of vulcanized rubber, such as vulcanization or adhesion, and they have conventionally been incorporated entirely in the second step together with sulfur and others, after the incorporation of carbon black.

While in the invention, the sulfide compound (B) is incorporated into the rubber for the purpose of further improving the lowered rolling resistance of the rubber achieved by the dinitrodiamine compound (A), and in order to ensure such lowered rolling resistance, the dinitrodiamine compound (A) and the sulfide compound (B) should be incorporated into the rubber in a kneading step at a high temperature (the first step) together with carbon black. In such a manner by blending the base rubber mainly comprising the styrene/butadiene copolymer rubber with the dinitrodiamine compound (A) and the sulfide compound (B) in combination with the carbon black in the kneading step at a high temperature, further lowering in tan $\delta$ of the vulcanized rubber can be achieved at around 60° C.

The rubber blend, after the first kneading step, is then usually further blended with a vulcanizing agent, such as sulfur, and other necessary ingredients at a temperature lower than the temperature of the first kneading step, and thereafter vulcanized. The latter blending or kneading step (second step) is normally effected at a temperature ranging from about 40° to about 100° C.

Further in the invention, other various additives commonly used in the rubber industry can, of course, be used in accordance with their desired purpose.

The rubber composition comprising a styrene/butadiene copolymer rubber and compounded with the dinitrodiamine compound (A) and the sulfide compound (B) according to the invention is preferably used, for example, as various parts of automobile tires, particularly as a tread material for the tires. For example, the rubber composition can be applied as a tread material or other tire material, and shaped into tires by a usual manner employed in the tire industry.

The present invention will be explained in more detail hereinunder with reference to examples, which are only illustrative but not limitative of the scope of the invention. In the following examples, given parts are by weight unless otherwise indicated.

Dinitrodiamine compounds and sulfide compounds used in the examples are as follows, and they will be referred to hereinafter by the indicated letters.

Dinitrodiamine Compounds

A: N,N'-Bis(2-methyl-2-nitropropyl)-1,6-diaminohexane
B: N,N'-Bis(2-methyl-2-nitropropyl)-1,4-diaminobutane
C: N,N'-Bis(2-methyl-2-nitropropyl)-1,12-diaminododecane
D: N,N'-Bis(2-methyl-2-nitropropyl)-1,4-diaminobenzene Sulfide Compounds R: Dibenzothiazyl disulfide
S: Tetraethylthiuram disulfide
T: Tetrabutylthiuram disulfide
U: p-Pentylphenol sulfide resin ("SUMIFINE AP" produced by Sumitomo Chemical Co., Ltd., having a softening point of 90°–110° C. and a sulfur content of 25–28% by weight)
V: p-Octylphenol sulfide resin ("SUMIFINE V-200" produced by Sumitomo Chemical Co., Ltd., having a softening point of 90°–110° C. and a sulfur content of 22–26% by weight)

Tests for rubber properties in the examples were conducted by the following methods.

Mooney Scorching

A rubber blend before vulcanization was tested in accordance with JIS K 6300, and a time required for increasing by 5 points from the lowest value at 135° C. was determined as a scorch time.

60° C. tan δ (loss factor)

It was determined under a static strain of 10%, a dynamic strain of 10%, a frequency of 10 Hz and a temperature of 60° C., using a viscoelasticity spectrometer manufactured by Iwamoto Seisakusho Co. The smaller the value, the lower the rolling resistance.

Tensile stress ($M_{300}$)

It was determined in accordance with JIS K 6301 by using a dumbbell specimen.

EXAMPLE 1

[Compounding Formulation]

| | |
|---|---|
| Styrene/butadiene copolymer rubber (SBR #1500) | 100 parts |
| Carbon black (HAF black (N330)) | 45 parts |
| Stearic acid | 3 parts |
| Zinc oxide | 5 parts |
| Aromatic process oil | 3 parts |
| Antioxidant (N-Phenyl-N'-1,3-dimethylbutyl-p-phenylenediamine) | 2 parts |
| Vulcanization accelerator (N-Cyclohexyl-2-benzothiazylsulfenamide) | 1 part |
| Sulfur | 2 parts |
| Dinitrodiamine compound | Shown in Table 1 |
| Sulfide compound | Shown in Table 1 |

Using a 250 ml Laboplastomill manufactured by Toyo Seiki Co. as a Banbury mixer, a first kneading step was conducted at an oil bath temperature of 170° C. by charging the mixer with the styrene/butadiene copolymer rubber, dinitrodiamine compound, sulfide compound, carbon black, stearic acid, process oil and zinc oxide in accordance with the above compounding formulation, and kneading the mixture for 10 minutes with a mixer revolution of 60 rpm. The rubber temperature at that time was 165° to 185° C.

The resulting rubber blend was then transferred to an open mill, and a second kneading step was conducted at a temperature of 60° to 70° C. by adding thereto the antioxidant, vulcanization accelerator and sulfur shown in the above formulation, and kneading the mixture. Alternatively in some runs of the blend systems, the sulfide compound was added in the second kneading step together with the sulfur etc., instead of being added in the first kneading step. A part of the kneaded mixture was subjected to the Mooney scorching test mentioned above. The remaining kneaded mixture was vulcanized with a vulcanizing press at 170° C. for 25 minutes, and thereafter the vulcanized rubber was subjected to determination of the 60° C. tan δ and tensile stress properties mentioned above.

The test results were summarized in Table 1. In the column of the compounding step for the sulfide compound in Table 1, "first" means that the sulfide compound has been added at the first kneading step, and "second" means that the sulfide compound has been added at the second kneading step.

TABLE 1

| | | | Invention Run No. | | | | | | | | | |
|---|---|---|---|---|---|---|---|---|---|---|---|---|
| | | | 1 | 2 | 3 | 4 | 5 | 6 | 7 | 8 | 9 | 10 |
| Additives (part) | Dinitrodiamine compound | A | 1.5 | 1.5 | 1.5 | 1.5 | 1.5 | | | | | |
| | | B | | | | | | 1.5 | 1.5 | | | |
| | | C | | | | | | | | 1.5 | 1.5 | |
| | | D | | | | | | | | | | 1.5 |
| | Sulfide compound | Di-sulfide | R | 0.5 | | | | | | | | | 0.5 |
| | | | S | | 0.5 | | | | | | | | |
| | | | T | | | 0.5 | | | | | | | |
| | | Sulfide resin | U | | | | 0.5 | | 0.5 | | 0.5 | | |
| | | | V | | | | | 0.5 | | 0.5 | | 0.5 | |
| | | Compounding step | | first | first | first | first | first | first | first | first | first | first |
| Rubber properties | Scorch time (min.) | | 11.8 | 11.5 | 11.7 | 11.5 | 11.5 | 11.2 | 11.6 | 11.4 | 11.7 | 11.5 |
| | 60° C. tan δ | | 0.123 | 0.124 | 0.123 | 0.118 | 0.117 | 0.119 | 0.118 | 0.120 | 0.121 | 0.124 |
| | $M_{300}$ (kg/cm$^2$) | | 160 | 163 | 167 | 165 | 159 | 162 | 163 | 161 | 160 | 167 |

| | Invention | | | | Comparison | | | | |
|---|---|---|---|---|---|---|---|---|---|
| | Run No. | | | | | | | | |
| | 11 | 12 | 13 | 14 | 15 | 16 | 17 | 18 | 19 |

TABLE 1-continued

| Additives (part) | Dinitrodiamine compound | A | | | | | none | 1.5 | | | |
| | | B | | | | | | | 1.5 | | |
| | | C | | | | | | | | 1.5 | |
| | | D | 1.5 | 1.5 | 1.5 | 1.5 | | | | | 1.5 |
| | Sulfide compound | Di-sulfide | R | | | | | | | | |
| | | | S | 0.5 | | | | | | | |
| | | | T | | 0.5 | | | | | | |
| | | Sulfide resin | U | | | 0.5 | | | | | |
| | | | V | | | | 0.5 | | | | |
| | | Compounding step | | first | first | first | first | | | | |
| Rubber properties | Scorch time (min.) | | | 11.7 | 11.8 | 11.3 | 12.0 | 20.7 | 11.3 | 11.6 | 11.7 | 11.6 |
| | 60° C. tan δ | | | 0.123 | 0.121 | 0.118 | 0.120 | 0.144 | 0.131 | 0.133 | 0.133 | 0.132 |
| | $M_{300}$ (kg/cm$^2$) | | | 166 | 162 | 168 | 165 | 146 | 155 | 154 | 155 | 157 |

| | | | | Comparison Run No. | | | | | | | | |
| --- | --- | --- | --- | --- | --- | --- | --- | --- | --- | --- | --- | --- |
| | | | | 20 | 21 | 22 | 23 | 24 | 25 | 26 | 27 | 28 |
| Additives (part) | Dinitrodiamine compound | A | | | | | | 1.5 | 1.5 | | | |
| | | B | | | | | | | | 1.5 | | |
| | | C | | | | | | | | | 1.5 | |
| | | D | | | | | | | | | | 1.5 |
| | Sulfide compound | Di-sulfide | R | 0.5 | | | | | | | | |
| | | | S | | 0.5 | | | | | | | |
| | | | T | | | 0.5 | | | 0.5 | | | |
| | | Sulfide resin | U | | | | 0.5 | | | | | |
| | | | V | | | | | 0.5 | | 0.5 | 0.5 | 0.5 |
| | | Compounding step | | first | first | first | first | first | second | second | second | second |
| Rubber properties | Scorch time (min.) | | | 18.6 | 16.4 | 15.9 | 17.3 | 18.9 | 16.8 | 16.5 | 17.1 | 17.1 |
| | 60° C. tan δ | | | 0.138 | 0.139 | 0.138 | 0.139 | 0.140 | 0.137 | 0.139 | 0.138 | 0.140 |
| | $M_{300}$ (kg/cm$^2$) | | | 180 | 175 | 186 | 200 | 194 | 194 | 189 | 191 | 205 |

EXAMPLE 2

| [Compounding Formulation] | |
| --- | --- |
| Solution polymerized styrene/butadiene copolymer rubber ("SOLPRENE 1204R" produced by Asahi Chemical Industry Co., Ltd.) | 80 parts |
| Natural rubber (RSS #1) or Butadiene rubber ("BR 01" produced by Japan Synthetic Rubber Co., Ltd.) | 20 parts |
| Carbon black (HAF-HS black (N339)) | 50 parts |
| Stearic acid | 3 parts |
| Aromatic process oil | 5 parts |
| Zinc oxide | 5 parts |
| Antioxidant (2,2,4-Trimethyl-1-,2-dihydroquinoline polymer) | 2 parts |
| Vulcanization accelerator (N-t-Butyl-2-benzothiazylsulfenamide) | 1 part |
| Sulfur | 2 parts |
| Dinitrodiamine compound | Shown in Table 2 |
| Sulfide compound | Shown in Table 2 |

Based on the above compounding formulation in which the base rubber was a blend of the solution polymerized styrene/butadiene copolymer rubber with the natural rubber or butadiene rubber, the procedure of Example 1 was repeated, but the vulcanization was effected at 155° C. for 50 minutes. The sulfide compound was added at the first kneading step together with the carbon black and dinitrodiamine compound in every run of this example. The test results were summarized in Table 2.

TABLE 2

| | | | Invention | | | | | | | | Comparison | |
| --- | --- | --- | --- | --- | --- | --- | --- | --- | --- | --- | --- | --- |
| | | | Run No. | | | | | | | | | |
| | | | 1 | 2 | 3 | 4 | 5 | 6 | 7 | 8 | 9 | 10 |
| Formulation (part) | Rubber kind | Styrene/butadiene copolymer rubber | 80 | 80 | 80 | 80 | 80 | 80 | 80 | 80 | 80 | 80 |
| | | Natural rubber | 20 | 20 | 20 | 20 | | | | | 20 | |
| | | Butadiene rubber | | | | | 20 | 20 | 20 | 20 | | 20 |
| | Dinitrodiamine compound | A | 1.5 | 1.5 | | | 1.5 | 1.5 | | | none | none |
| | | D | | | 1.5 | 1.5 | | | 1.5 | 1.5 | | |
| | Sulfide compound | U | 0.5 | | 0.5 | | 0.5 | | 0.5 | | | |
| | | V | | 0.5 | | 0.5 | | 0.5 | | 0.5 | | |
| Rubber properties | Scorch time (min.) | | 12.5 | 12.7 | 13.2 | 12.9 | 12.1 | 12.3 | 12.6 | 12.5 | 22.5 | 21.1 |
| | 60° C. tan δ | | 0.119 | 0.121 | 0.120 | 0.118 | 0.121 | 0.123 | 0.125 | 0.120 | 0.142 | 0.145 |
| | $M_{300}$ (kg/cm$^2$) | | 152 | 151 | 150 | 155 | 157 | 158 | 159 | 158 | 140 | 144 |

| | | | Comparison Run No. | | | | | | | |
| --- | --- | --- | --- | --- | --- | --- | --- | --- | --- | --- |
| | | | 11 | 12 | 13 | 14 | 15 | 16 | 17 | 18 |
| Formulation (part) | Rubber kind | Styrene/butadiene | 80 | 80 | 80 | 80 | 80 | 80 | 80 | 80 |

TABLE 2-continued

| | | | | | | | | | | |
|---|---|---|---|---|---|---|---|---|---|---|
| | copolymer rubber | | | | | | | | | |
| | Natural rubber | | 20 | 20 | | | 20 | 20 | | |
| | Butadiene rubber | | | | 20 | 20 | | | 20 | 20 |
| | Dinitrodiamine compound | A | 1.5 | | 1.5 | | | | | |
| | | D | | 1.5 | | 1.5 | | | | |
| | Sulfide compound | U | | | | | 0.5 | | 0.5 | |
| | | V | | | | | | 0.5 | | 0.5 |
| Rubber properties | Scorch time (min.) | | 12.4 | 13.3 | 12.6 | 12.5 | 22.3 | 21.5 | 21.1 | 20.4 |
| | 60° C. tan δ | | 0.128 | 0.131 | 0.132 | 0.134 | 0.141 | 0.138 | 0.141 | 0.139 |
| | M$_{300}$ (kg/cm$^2$) | | 150 | 154 | 154 | 156 | 150 | 153 | 157 | 158 |

According to the present invention, addition of a sulfide compound represented by the formula (II) or (III) to a styrene/butadiene copolymer rubber in combination with carbon black and a dinitrodiamine compound represented by the formula (I) produces a vulcanized rubber further lowered in tan δ at around 60° C. which corresponds to the rolling resistance of automobile tires. Therefore, the rubber composition comprising mainly a styrene/butadiene copolymer rubber obtained by the invention is effective for tire materials, such as a tread material, and automobiles loading the tires prepared from such rubber composition are expected to show improvements in economy based on reduced fuel consumption.

Though the invention has been described with respect to specific embodiments and examples, it is to be understood for the person skilled in the art that the invention is not limited to the details given herein but may be modified and changed within the scope of the appended claims.

What is claimed is:

1. A rubber composition comprising a base rubber comprising at least 50% by weight of a styrene/butadiene copolymer rubber, a filler consisting essentially of carbon black, and the following components each based on 100 parts by weight of the base rubber:

(A) 0.1 to 10 parts by weight of a dinitrodiamine compound represented by the following formula (I):

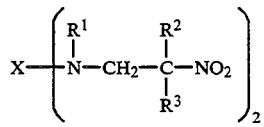

wherein X is a divalent aliphatic, alicyclic or aromatic group which may contain halogen or oxygen in the group; R$^1$ is hydrogen or an aliphatic, alicyclic or aromatic group, provided that two nitrogen atoms linking through X may further link through R$^1$ when both X and R$^1$ are the aliphatic groups; and R$^2$ and R$^3$ independently of one another are each hydrogen or an alkyl of 1 to 12 carbon atoms, provided that R$^2$ and R$^3$ may conjointly form a ring; and (B) 0.1 to 1 part by weight of a sulfide compound selected from the group consisting of disulfide represented by the following formula (II):

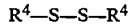  (II)

wherein R$^4$ is benzothiazyl or N,N-dialkylthiocarbamoyl having 1 to 6 carbon atoms in each alkyl; and a substituted phenol sulfide resin represented by the following formula (III):

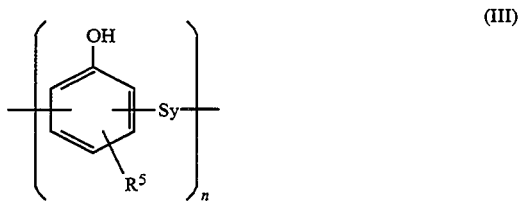

wherein R$^5$ is an aliphatic group of 1 to 12 carbon atoms or hydroxy, y is a numeral of 1 to 6, and n is a numeral of 1 to 20;

said components (A) and (B) being added to the base rubber together with the carbon black at a high temperature ranging from about 140° to about 200° C.

2. The rubber composition of claim 1, wherein the base rubber consists essentially of a styrene/butadiene copolymer rubber.

3. The rubber composition of claim 1, wherein the base rubber is a blend system mainly composed of a styrene/butadiene copolymer rubber and blended with a natural rubber or a butadiene rubber.

4. The rubber composition of claim 1, wherein the carbon black has a nitrogen absorption specific surface area of from about 30 to about 130 m$^2$/g.

5. The rubber composition of claim 1, wherein the carbon black is present in an amount of from about 10 to about 150 parts by weight based on 100 parts by weight of the base rubber.

6. The rubber composition of claim 1, wherein X in the formula (I) is an aliphatic group of 4 to 12 carbon atoms.

7. The rubber composition of claim 1, wherein X in the formula (I) is phenylene.

8. The rubber composition of claim 1, wherein R$^1$ in the formula (I) is hydrogen, and R$^2$ and R$^3$ in the formula (I) are both methyl.

9. The rubber composition of claim 1, wherein the dinitrodiamine compound is represented by the formula (I) in which X is an alkylene of 4 to 12 carbon atoms or phenylene, R$^1$ is hydrogen, R$^2$ is methyl, and R$^3$ is methyl.

10. The rubber composition of claim 1, wherein the dinitrodiamine compound is present in an amount of from 0.2 to 3 parts by weight based on 100 parts by weight of the base rubber.

11. The rubber composition of claim 1, wherein the sulfide compound is the disulfide selected from dibenzothiazyl disulfide, tetramethylthiuram disulfide, tetraethylthiuram disulfide and tetrabutylthiuram disulfide.

12. The rubber composition of claim 1, wherein the sulfide compound is the substituted phenol sulfide resin selected from p-pentylphenol sulfide resin, p-octylphenol sulfide resin and resorcin sulfide resin.

13. The rubber composition of claim 1, wherein the sulfide compound is the substituted phenol sulfide resin represented by the formula (III) in which $R^5$ is an alkyl of 3 to 10 carbon atoms.

14. A process for producing a rubber composition which comprises adding simultaneously (A) a dinitrodiamine compound represented by the following formula (I):

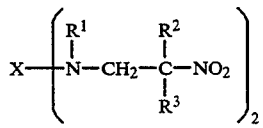

wherein X is a divalent aliphatic, alicyclic or aromatic group which may contain halogen or oxygen in the group; $R^1$ is hydrogen or an aliphatic, alicyclic or aromatic group, provided that two nitrogen atoms linking through X may further link through $R^1$ when both X and $R^1$ are the aliphatic groups; and $R^2$ and $R^3$ independently of one another are each hydrogen or an alkyl of 1 to 12 carbon atoms, provided that $R^2$ and $R^3$ may conjointly form a ring; and (B) a sulfide compound selected from the group consisting of disulfide represented by the following formula (II):

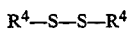

wherein $R^4$ is benzothiazyl or N,N-dialkylthiocarbamoyl having 1 to 6 carbon atoms in each alkyl; and a substituted phenol sulfide resin represented by the following formula (III):

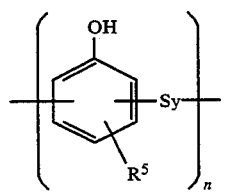

wherein $R^5$ is an aliphatic group of 1 to 12 carbon atoms or hydroxy, y is a numeral of 1 to 6, and n is a numeral of 1 to 20;
in conjunction with a filler consisting essentially of carbon black to a base rubber comprising at least 50% by weight of a styrene/butadiene copolymer rubber at a high temperature ranging from about 140° to about 200° C.; and
kneading the resulting rubber blend at around that temperature.

15. The process of claim 14, wherein the adding and kneading are effected at a temperature ranging from about 170° to about 200° C.

16. The process of claim 14, which further comprises blending the resulting kneaded rubber with a vulcanizing agent at a temperature lower than the preceding kneading temperature, and vulcanizing the resulting rubber composition.

17. The process of claim 16, wherein the blending with the vulcanizing agent is effected at a temperature ranging from about 40° to about 100° C.

18. A method for lowering a rolling resistance of an automobile tire, which comprises blending a base rubber comprising at least 50% by weight of a styrene/butadiene copolymer rubber with (A) a dinitrodiamine compound represented by the following formula (I):

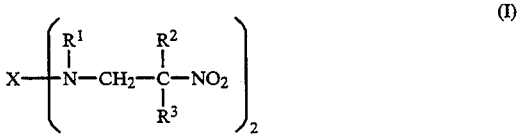

wherein X is a divalent aliphatic, alicyclic or aromatic group which may contain halogen or oxygen in the group; $R^1$ is hydrogen or an aliphatic, alicyclic or aromatic group, provided that two nitrogen atoms linking through X may further link through $R^1$ when both X and $R^1$ are the aliphatic groups; and $R^2$ and $R^3$ independently of one another are each hydrogen or an alkyl of 1 to 12 carbon atoms, provided that $R^2$ and $R^3$ may conjointly form a ring; and (B) a sulfide compound selected from the group consisting of disulfide represented by the following formula (II):

wherein $R^4$ is benzothiazyl or N,N-dialkylthiocarbamoyl having 1 to 6 carbon atoms in each alkyl; and a substituted phenol sulfide resin represented by the following formula (III):

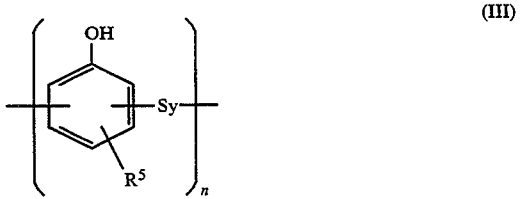

wherein $R^5$ is an aliphatic group of 1 to 12 carbon atoms or hydroxy, y is a numeral of 1 to 6, and n is a numeral of 1 to 20;
simultaneously together with a filler consisting essentially of carbon black in a kneading step of a high temperature ranging from about 140° to about 200° C.

* * * * *